Patented Apr. 8, 1930

1,754,031

UNITED STATES PATENT OFFICE

FRITZ MAYER, OF FRANKFORT-ON-THE-MAIN, KURT BILLIG, OF HOCHST-ON-THE-MAIN, KARL HORST, OF HOFHEIM-ON-THE-TAUNUS, AND KARL SCHIRMACHER, OF HOCHST-ON-THE-MAIN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

CYCLIC KETONES OF THE AROMATIC SERIES AND PROCESS OF MAKING SAME

No Drawing. Application filed March 15, 1927, Serial No. 175,630, and in Germany March 16, 1926.

Our present invention relates to the preparation of cyclic ketones of the aromatic series.

We have found that $\alpha$-$\beta$ unsaturated fatty acids as well as their addition products with hydrogen halide and the halides of these acids, when reacted upon with a hydrocarbon of the aromatic series, a homologue or substitution product thereof in which at least two adjacent carbon atoms contain hydrogen as a substituent, in presence of an acid condensing agent such as aluminium chloride or concentrated sulfuric acid, in absence or presence of a solvent, at a raised temperature, form aromatic cyclic ketones. The reaction takes place very readily and the result obtained thereby is novel and could not be foreseen. Accordingly as the hydrocarbon is substituted there can be obtained by the said reaction mixtures of isomeric cyclic ketones, which can generally be easily separated. It is of no consequence whether there are used the olefine carboxylic acids or their addition products with hydrogen halide, because the latter are transformed during the reaction into the former. It is also immaterial whether the free acids of their halides are used as starting material, in all cases there are obtained the same final products.

Our new process permits to arrive in an easy technical way at a great number of heretofore unknown or difficultly obtainable cyclic ketones. A number of the cyclic ketones in question constitute valuable intermediate products for the manufacture of dyestuffs and pharmaceutical products.

The following examples serve to illustrate our invention, but they are not intended to limit it thereto; the parts are by weight:

(1) Into a suspension of 27 parts of aluminium chloride in 10 parts of benzene is slowly run at ordinary temperature a solution of 11 parts of $\beta$-chlorpropionic acid and 16 parts of benzene. The temperature is then raised to boiling and kept so for several hours. After decomposition with ice and hydrochloric acid the reaction mixture may be worked up by subjecting it to distillation with steam, during which there distils over at first only benzene and afterwards the cyclic ketone ($\alpha$-indanone) which solidifies into crystals, forming large leaflets, and melts at 40° C. according to the statements in literature.

(2) Into a solution of 90 parts of toluene and 11 parts of $\beta$-chlorpropinoic acid are introduced in small portions, while cooling, 27 parts of aluminium chloride, whereupon the temperature is raised within one hour until the toluene boils, the said temperature being maintained for two hours. After the mass has been decomposed with ice and hydrochloric acid, the toluene is blown off and the remaining mass is worked up as indicated in Example 1. Thus there is obtained a liquid mixture which is composed of two isomeric cyclic ketones of the following formula:

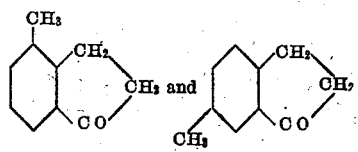

(3) A mixture of 11 parts of $\beta$-chlorpropionic acid and 22 parts of chlorobenzene is run at ordinary temperature into a mixture of 27 parts of aluminium chloride and 10 parts of chlorobenzene, whereupon the temperature is raised up to 100° C. or above and after some hours the resulting mass is further treated as indicated in Example 1. Thus a mixture composed of two isomeric chlorinated cyclic ketones is obtained. When this mixture is recrystallized from alcohol, there separates first almost only the cyclic ketone of the constitution:

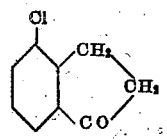

This ketone has its melting point at 91–92° C. From the mother liquor there may, moreover, be separated the cyclic ketone of the formula:

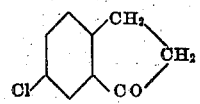

which has its melting point at 79° C.

In quite an analogous manner $\beta$-chlorpropionic acid may be caused to act upon, for instance, bromobenzene, o-dichlorobenzene, m-dichlorobenzene, m-dibromobenzene or o-chlorotoluene to form the pertaining cyclic ketones.

(4) Into a solution of 61 parts of β-chlorobutyric acid in 390 parts of benzene is slowly added, while stirring, 134 parts of pulverized aluminium chloride. The temperature is gradually raised until the boiling point of the benzene is reached and is kept so for some hours. After the mass has been worked up in the usual manner, the volatile cyclic ketone of the formula:

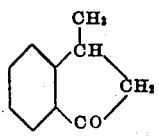

is obtained, which boils at 255° C.

(5) In an analogous manner is obtained by using chlorobenzene a mixture of the following cyclic ketones:

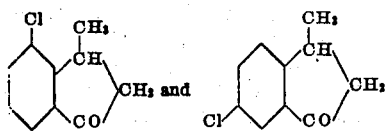

The former ketone crystallizes and melts at about 47° C., the latter is liquid and boils at 275° C.

(6) When using m-xylene, the cyclic ketone of the formula:

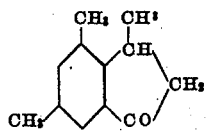

is formed which boils at about 250° C.

(7) To 27 parts of aluminium chloride suspended in 22 parts of chlorobenzene are added in small portions at ordinary temperature 9 parts of crotonic acid, whereupon the temperature is raised to the boiling point and the mass is stirred at this temperature for some time. After cooling, the mass is worked up in the usual manner. Thus a mixture of the two isomeric cyclic ketones is obtained which is identical with the mixture produced according to Example 5.

(8) To 50 parts of m-dichlorobenzene and 27 parts of aluminium chloride are added at ordinary temperature 9 parts of solid crotonic acid and the mass is heated for some time to 100° C. After the mass has been worked up in the usual manner, the cyclic ketone of the following formula:

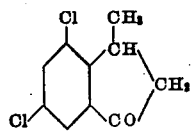

is obtained, which melts at 67–70° C.

Analogous products are obtained by the action of crotonic acid upon o-dichlorobenzene (the product being an oil boiling at about 200° C.), upon bromobenzene (the product being a mixture of a solid product melting at 83° C. and a liquid product boiling at about 260° C.), upon m-xylene (the product being an oil boiling at about 250°).

(9) 74 parts of cinnamic acid and 192 parts of naphthalene are dissolved in 390 parts of nitrobenzene and gradually mixed at about 45° C., while vigorously stirring, with 500 parts of sulfuric acid of 85% strength. After having stirred this mixture for 5 hours at the said temperature, the reaction mass is poured on ice and then rendered slightly alkaline by adding sodium carbonate. The nitrobenzene is separated from the aqueous alkaline solution. After having added to the latter hydrochloric acid, an oily acid precipitates which, after drying, solidifies into a light, brittle resin.

In order to transform this product into the cyclic ketone, 100 parts of it are heated at about 50° C. for one hour with 500 parts of nitrobenzene and 85 parts of phosphorous pentachloride and there are then added at 10° C. 70 parts of aluminium chloride. The whole is then stirred for about 24 hours at 30° C. whereupon the mass is poured on ice and the nitrobenzene removed by distillation with steam. The cyclic ketone thus formed may be further purified by boiling it with a solution of sodium carbonate. In order to obtain it in a perfectly pure state, it is advisable to distill the crude product in the vacuum and to recrystallize the distillate from alcohol. The resulting product forms brilliant yellow needles melting at 140–142° C. which dissolve in sulfuric acid to a yellow solution with a yellowish-green fluorescence.

(10) A solution of 14,2 parts of α-methylnaphthalene and 12,7 parts β-chlorpropionic acid chloride is gradually introduced into a suspension of 30 parts of aluminium chloride in 120 parts of carbon disulfide. After the mass has been worked up in the usual manner, the reaction product first formed is introduced into concentrated sulfuric acid and heated to 90–100° C. during half an hour. On pouring it in water the cyclic ketone of the formula:

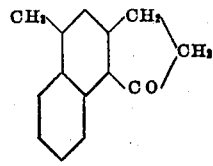

separates which melts at 133° C.

(11) If the β-chlorpropionic acid chloride as used in Example 10 is replaced by 14,1 parts of β-chlorbutyric acid chloride and the other operations are carried out according to the said example the cyclic ketone of the formula:

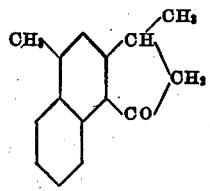

is obtained which melts at 67–68° C.

In the following claims the term "α-β-unsaturated fatty acid compound" is intended to include α-β-unsaturated fatty acids and their hydrogen halide addition products as well as their halides; and the term "aromatic compound" is intended to comprise aromatic hydrocarbons and their homologues and substitution products.

We claim:

1. The process for preparing cyclic ketones of the aromatic series, which consists in subjecting an unsaturated fatty acid compound to reaction with an aromatic compound in which at least two adjacent carbon atoms contain hydrogen as a substituent in presence of aluminium chloride at a temperature of about 40° C. to 140° C.

2. As new products cyclic ketones of the general formula:

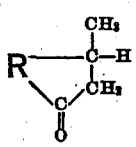

wherein R represents a substituted aromatic radical of the group including the benzene and naphthalene series.

3. As new products cyclic ketones of the general formula:

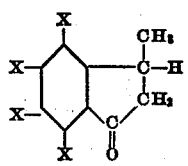

wherein X may stand for hydrogen, halogen or one of the groups hydroxyl, oxyalkyl or alkyl or two adjacent X's may be a ring linked to the benzene nucleus, in which formula however at least one X signifies a substituent other than hydrogen.

4. As new products cyclic ketones of the general formula:

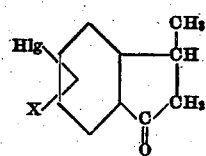

wherein Hlg stands for a halogen atom and X stands for hydrogen or a halogen atom.

5. As new products, halogen-containing cyclic ketones of the following formula:

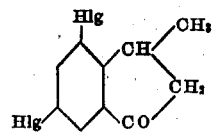

6. As a new product, the chlorine-containing cyclic ketone of the following formula:

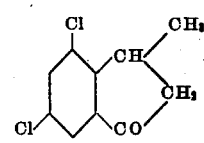

In testimony whereof, we affix our signatures.

PROFESSOR DR. FRITZ MAYER.
KURT BILLIG.
KARL HORST.
KARL SCHIRMACHER.